United States Patent [19]
Rusk et al.

[11] 3,870,092
[45] Mar. 11, 1975

[54] GUIDE BUSHING

[75] Inventors: Gerald Rusk, Maumee, Ohio;
Robert E. Koch, Ottawa, Mich.

[73] Assignee: The Freeman Supply Company,
Toledo, Ohio

[22] Filed: May 29, 1973

[21] Appl. No.: 364,971

[52] U.S. Cl. ............... 151/14 R, 151/67, 164/249, 164/385
[51] Int. Cl. ............................................. F16b 39/00
[58] Field of Search ......... 151/67, 15, 14 R, 15, 67; 85/45; 164/249, 385; 52/753 F, 585

[56] References Cited
UNITED STATES PATENTS

| | | | |
|---|---|---|---|
| 118,685 | 9/1871 | Bonnell | 151/15 |
| 1,292,707 | 1/1919 | Clark | 151/67 |
| 1,604,445 | 10/1926 | Hem | 151/15 |
| 1,866,855 | 7/1932 | Kirsten | 151/67 |
| 2,451,747 | 10/1948 | Kindt | 164/249 |
| 2,631,624 | 3/1953 | Wright | 85/45 |
| 3,044,584 | 7/1962 | Thompson | 85/45 |
| 3,190,169 | 6/1965 | Rosan | 85/45 |

FOREIGN PATENTS OR APPLICATIONS

| | | | |
|---|---|---|---|
| 12,008 | 8/1901 | Great Britain | 151/15 |
| 380,448 | 9/1964 | Switzerland | 151/15 |

*Primary Examiner*—Edward C. Allen

[57] ABSTRACT

A bushing for aligning sections of mold quipment and the like having course external threads at one end and fine external threads at the other end, and a flange ring threaded onto the fine external threads. The fine external threads preferably have a lead greater than the course external threads, and a set screw or other means are provided for preventing rotation of the flange ring relative to external structure.

10 Claims, 10 Drawing Figures

GUIDE BUSHING

BACKGROUND OF THE INVENTION

The present invention relates to alignment means of the type wherein guide pins on one part project into bushings in another part that is to be aligned therewith. In one type of commercial foundry core making apparatus, for example, the mold for producing the cores comprises two half sections, that are usually made of cast iron or some other metal, and each of which has a cavity therein corresponding to one half of the core that is to be formed. These metal mold sections are sometimes called hot boxes, and the hot boxes must be capable of being separated and put together quickly and accurately so that the cavity in one hot box will accurately register with the cavity in the other hot box. The matching surfaces of the hot boxes are usually provided with recesses, which form a blow hole through which sand and binder are forced into the core cavity. The hot boxes are also provided with vents which retain the sand but allow air to be expelled as the core cavity is being filled with the sand and binder. The hot boxes are heated to between 300°F and 600°F to transform the binder into a thermoset condition and bond the particles of sand together into a rigid core. The sand is usually at room temperature when blown into the hot boxes, so that the hot boxes experience a drop in temperature when forming a core, and a rise in temperature when separated to eject a core.

The hot boxes are aligned using guide pins and bushings. A bushing adjacent a central portion of the boxes is provided with a cylindrical opening to provide a reference bushing, and the bushings positioned remotely therefrom are provided with elongated openings to form guide bushings which accomodate differences in thermal expansion between the hot boxes. The guide bushings are conventionally provided with a flange on the end which receives the guide pin. The flange of a bushing is seated in a recess in the box in which the bushing is installed; and during installation, the elongated opening of a guide bushing must be aligned relative to the reference bushing, so that there is no binding as the pattern plate expands in all directions from the reference bushing.

Prior to the present invention, the bushings which were made for insertion in a blind hole had cylindrical exterior surfaces which were pressed into the hot box, or other receiving structure, while the internal guide surfaces of the bushing were properly oriented with respect to the cylindrical bushing.

In those instances where the opening in which the bushing was to be inserted did not need to be a blind hole, a cylindrical opening was drilled through a flange, or other structure of the hot box, and a bushing having a long enough body to project through the opening was used. When the guide surfaces of the bushing were properly oriented, a nut was threaded onto the bushing against the back side of the structure. Expansion and contraction of bushings installed in either manner produces a loosening action which eventually frees the bushing.

An object of the present invention is the provision of a new and improved flanged guide bushing for use in blind holes which has threaded engagement with internal threads in a blind hole, and, nevertheless, can have its flange in tight engagement with the bottom of a flange receiving recess in the member in which the bushing is installed when the elongated internal opening of the bushing is oriented in any direction.

A further object of the invention is the provision of a new and improved guide bushing of the above described type the improved functionality of which is accomplished by structure that is inexpensive to produce and is rugged in construction, and which locks to prevent loosening or misalignment in its receiving structure.

DESCRIPTION OF THE PREFERRED EMBODIMENTS

Figure 1:
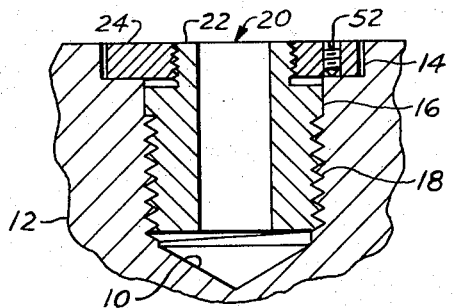
FIG. 1 of the drawings is a fragmentary sectional view of a guide bushing embodying principals of the present invention installed in a blind hole in shell core producing equipment.

FIG. 1 of the drawings shows one embodiment of guide bushing of the present invention installed in a blind hole 10 of shell molding equipment 12. Obviously, the bushings can be used in connection with other types of mold making equipment, as for example foundry flasks, etc. The opening 10 is counterbored at its outer end to provide a flange receiving recess 14 and is further stepped inwardly thereof to provide a cylindrical guide section 16 and a threaded section 18 inwardly thereof, the threads of which have a diameter no greater than that of the cylindrical section 16. A guide bushing 20 having a generally tubular body member 22 and a separable flange 24 is adapted to be threaded into the blind hole 10 with its flange 24 seated against the shoulder of the counterbore 14. The tubular body portion 22 of the guide bushing 20 can be made of tubular bar stock by automatic screw machinery. The lower end of the body portion is provided with a first run of threads, and preferably course threads, for threading engagement with the corresponding course threads 18 in the receiving equipment. The opposite end of the body member is of slightly reduced diameter and is provided with a second run of threads 28 which are preferably of smaller size (finer threads) than are the threads 26. In the preferred embodiment of the invention, the second run of threads 28 have a greater lead than does the first run of threads 26 for reasons which will later be described. This is accomplished by utilizing two parallel helical threads 30 and 32 which are spaced apart by one half of the lead of the threads, and the annular flange 24 is provided with internal companion threads 34 and 36. The flange 24 is provided with suitable wrench engagement surfaces 38 and 40 which are conveniently provided by a milled recess 42 which extends diametrically across the flange for approximately one half of the depth of the flange. The body of the bushing 20 has an axially extending opening 44 therethrough having hemicylindricl side surfaces 46 and 48 that are spaced apart by a pair of planar guide surfaces 50.

The embodiment of guide bushing shown in FIGS. 1-5 is installed in the opening 10 of its receiving machinery by means of a wrench having surfaces which are complementary in shape to the internal opening 50 of the body member 20. The tubular body member 20 is rotated to advance its threads 26 downwardly into the threads 18 until such time as the upper end of the body member 20 is flush with the top surface of the receiving structure 12. Thereafter the wrench is turned to bring the parallel guide surfaces 50 in line with the reference bushing. The flange 24 is then threaded by a spanner wrench having tangs which fit into the opposite ends of the recess 42 and which contact the wrench engaging surfaces 40 to torque the flange in tight engagement with the bottom of the counterbore 14. This torquing of the flange 24 against the bottom of the counterbore produces tension on the body member which pulls the threads 26 outwardly against the inwardly facing surfaces of the threads 18. The threads 34 and 36 of the flange likewise are forced against the inwardly facing surfaces of the second run of threads 28. After the flange is in tight engagement with the bottom of the counterbore 14, a set screw 52 is threaded inwardly so that its inner pointed end is deformed into the bottom of the counterbore 14 preferably at its juncture with the cylindrical section 16 of the opening 10. Not only is the edge of the counterbore 14 deformed, but a side moment is produced on the set screw 52 to provide a combined locking action for the set screw. Because the threads 28 have a greater lead than do the threads 26, the body member is locked into the threads 18 so long as the flange 24 is prevented from rotating. Both the threads 26 and 28 are right hand threads, although they both could be left hand threads.

It will be seen that counter-clockwise rotation of the body member when viewed from the flange end thereof would, if not moved axially of the threads 18, produce a loosening action with respect to the threads 18. According to the present invention, however, counterclockwise rotation of the body member causes the threads 28 to advance outwardly in the threads 34 and 36; and because the threads 34 and 36 have a greater lead than do the threads 18, the counterclockwise rotation of the body member can only tighten the threads 36 against the inwardly facing surfaces of the threads 18. So long as the flange 24, therefore, is prevented from rotating, the body member 20 cannot be removed from the opening 10. With the prior art integral flange bushings, not only is the flange not brought downwardly against the bottom of its receiving recess at a rate greater than the outward movement of the body member, but the flange is forced outwardly at the same rate as the body member, so that the prior art integral bushings become free to misalign their surfaces 50 and wear away the threads 18.

Because all parts of the guide bushing of the present invention are generally tubular products, all parts thereof can be made on an automatic screw machine using tubular feed stock. The body member 20 can have its course threads 26 threaded thereon at one end, the bar stock cut off at the proper length, and threads 28 formed thereon at the other end of the cut off section of the bar stock. As previously indicated, the threads 26 are a course thread, preferably a standard course thread, and the threads 28 are preferably a fine thread of smaller size because their diameter is less than the diameter of the threads 26. In addition, fine threads give better engagement with the thin flange 24. The threads 28 are preferably nonstandard in that they involve a plurality of helices, preferably two or more. The bar stock is preferably broached to provide an oblong opening 44 before the bar stock is cut into lengths forming the body members, but can be broached following the cutting of the tubular bar stock into lengths forming the body members.

The flanges 24 can likewise be made from tubular bar stock by running threads 34 and 36 into the sidewalls of the internal opening of the tubular bar stock, and following which the bar stock is cut into short lengths of the thickness of the flange 24. Thereafter an opening for the set screw 52 is drilled and tapped therein, and the recess 42 is milled into one surface of the flange. Following the machining thereof, the body member 20 is case hardened to provide surfaces for the oblong opening 44 which are file hard, so as to better withstand the abrasion of foundry sand.

Figure 6:
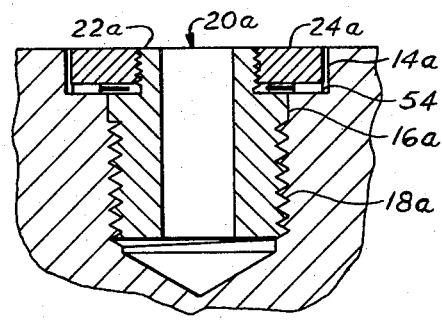
FIG. 6 is a fragmentary sectional view of another embodiment of the invention installed in shell core producing equipment.
Figure 2:
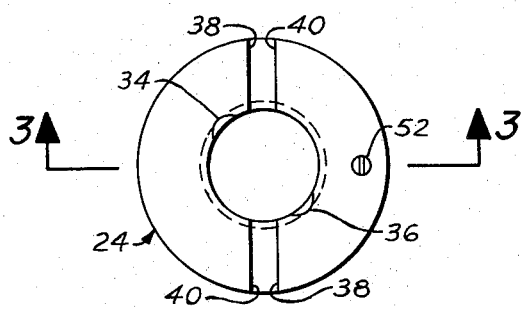
FIG. 2 is a plan view of the flange shown in FIG. 1.
Figure 7:
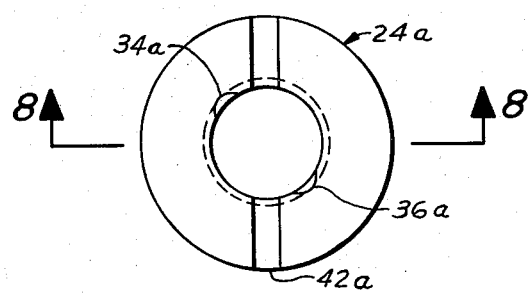
FIG. 7 is a plan view of the flange shown in FIG. 6.
Figure 3:
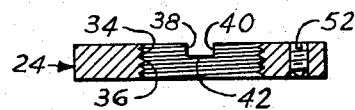
FIG. 3 is a sectional view taken approximately on the line 3—3 of FIG. 2.
Figure 8:
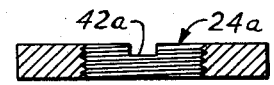
FIG. 8 is a sectional view taken approximately on the line 8—8 of FIG. 7.
Figure 4:
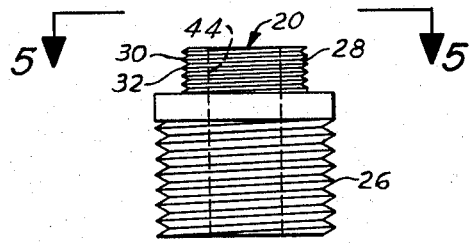
FIG. 4 is an elevational view of the body of the bushing shown in FIG. 1.
Figure 9:
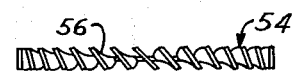
FIG. 9 is an elevational view of a star washer shown in FIG. 6.
Figure 5:
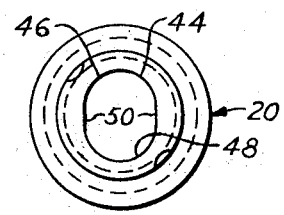
FIG. 5 is a sectional view taken approximately on the line 5—5 of FIG. 4.

The embodiment of guide bushing shown in FIGS. 6, 7 and 8 is generally similar to that shown in FIGS. 1-5 but differs principally therefrom in that a star washer 54 is used in place of the set screw 52 to prevent rotation of the flange. Those portions of the embodiment shown in FIGS. 6-8 which are generally similar to corresponding portions or the embodiment shown in FIGS. 1-5 are designated by a like reference numeral characterized further in that a subscript *a* is affixed thereto. The star washer 54 is positioned beneath the flange 24 against the bottom of the counterbore 14a, and the star washer 54 is of a type for use with right hand threads, so that its deformed outer edges slope in the direction of the clockwise tightening rotation of the flange 24a. The bent portions 56 are further bent by the tightening movement of the flan ge and dig into the bottom of the flange 24a. The deformed portions 56 of the star washer, therefore, become wedged between the flange and the bottom of the counterbore at an angle which directly opposes loosening movement of the flange 24a. In those instances where the threads 26a and 28a are left hand threads, the star washer 54 will be deformed in the opposite direction, so that they will likewise wedge against loosening action of a left hand threaded flange.

Figure 10:
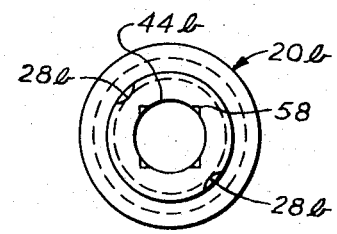
FIG. 10 is an end view similar to FIG. 5 but showing another embodiment of bushing having a cylindrical opening therein.

FIG. 10 of the drawings shows a bushing that is generally similar to the embodiments previously described, but differs principally therefrom in that its central opening 44 is cylindrical, so that the bushing can be used as a reference to prevent movement of a pin in all directions. Those portions of the embodiment shown in FIG. 10 which correspond to similar portions of the embodiment shown in FIGS. 1-5 are designated by a like reference numeral characterized further in that a subscript *b* is affixed thereto. Wrench receiving openings are provided in the sidewalls of the cylindrical opening 44b by four equally spaced longitudinally extending grooves 58, the side edges of which are arranged to form the edges of a square for the reception of a square wrench section. The grooves 58, therefore, forms wrench engaging surfaces which take the place of the surfaces 50 of the previously described embodiment.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. A bushing for aligning sections of mold equipment and the like comprising: a generally tubular member having an axially extending opening therethrough with wrench engagement surfaces in tis sidewalls, said tubular member having a first run of external threads on one end and a smaller diameter second run of external threads on the other end, said second run having a greater pitch than said first run, a flange ring threaded on said second run of threads, and means for locking the side of said flange ring facing said first run of threads to external structure.

2. The bushing of claim 1 including a flange ring having at least two notches extending between its radially inner and outer surfaces, said notches communicating with its surface facing away from said first run of external threads.

3. The bushing of claim 1 wherein said means comprises a set screw arranged to project through said flange exteriorly of said tubular member.

4. The bushing of claim 1 in which said first and second runs have a lead in the same direction.

5. The bushing of claim 4 in which said second run of threads comprises at least two parallel helical threads.

6. The bushing of claim 5 wherein said means comprises a set screw arranged to project through said flange exteriorly of said tubular member.

7. The bushing of claim 6 wherein said opening has opposing sidewalls which are hemicylindrical and are spaced apart by connecting planar guide surfaces.

8. A guide bushing comprising: a generally tubular guide bushing body having an axially extending opening in one end that includes two opposing generally hemicylindrical sections and having wrench engagement surfaces in its sidewalls, said tubular body having a first run of external threads on its other end and a smaller diameter second run of external threads on said one end, said second run having a lead in the same direction and having a greater pitch than those of said first run, a flange ring threaded onto said second run of threads, and means for locking said flange ring to external structure to prevent rotation, and whereby said generally tubular guide bushing body is kept from working loose from external structure by said flange ring.

9. The guide bushing of claim 8 wherein the threads of said second run are double threaded and have a height less than those of said first run of threads.

10. A guide bushing comprising: a generally tubular guide bushing body having an axially extending opening therethrough having two opposing generally hemicylindrical sections, said tubular body having a first run of external threads on one end and a smaller diameter second run of external threads on its other end, said second run being double threaded with threads of a height smaller than those of said first run, and having a lead greater than those of said first run, a flange ring threaded on said second run of threads, and means for locking said flange ring against rotation to external structure.

* * * * *